Jan. 16, 1940.     J. E. ENGLESSON     2,187,147
SWIVEL JOINT
Filed April 5, 1939
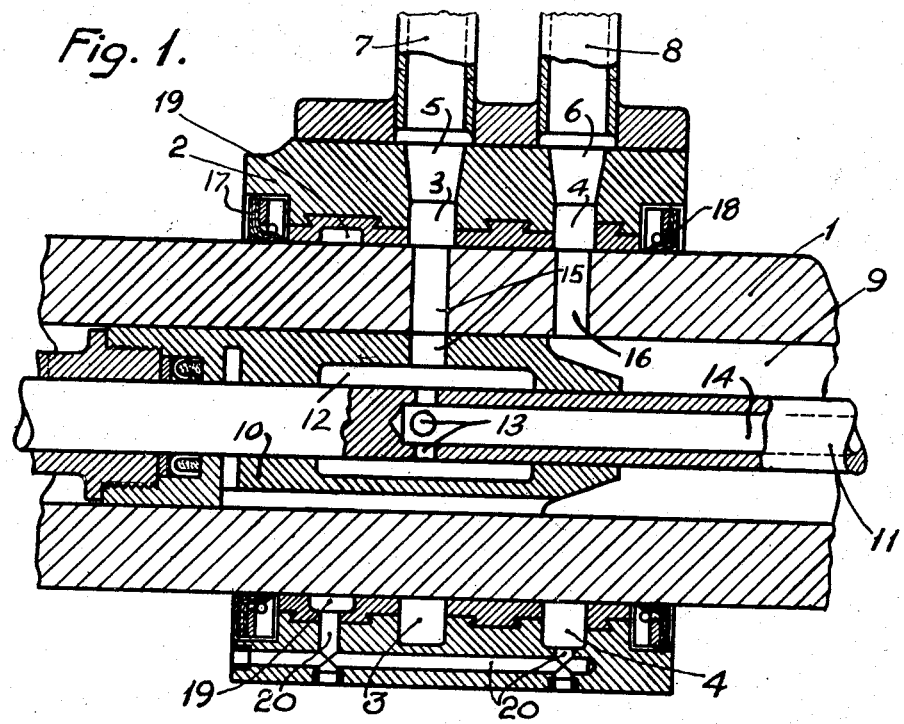
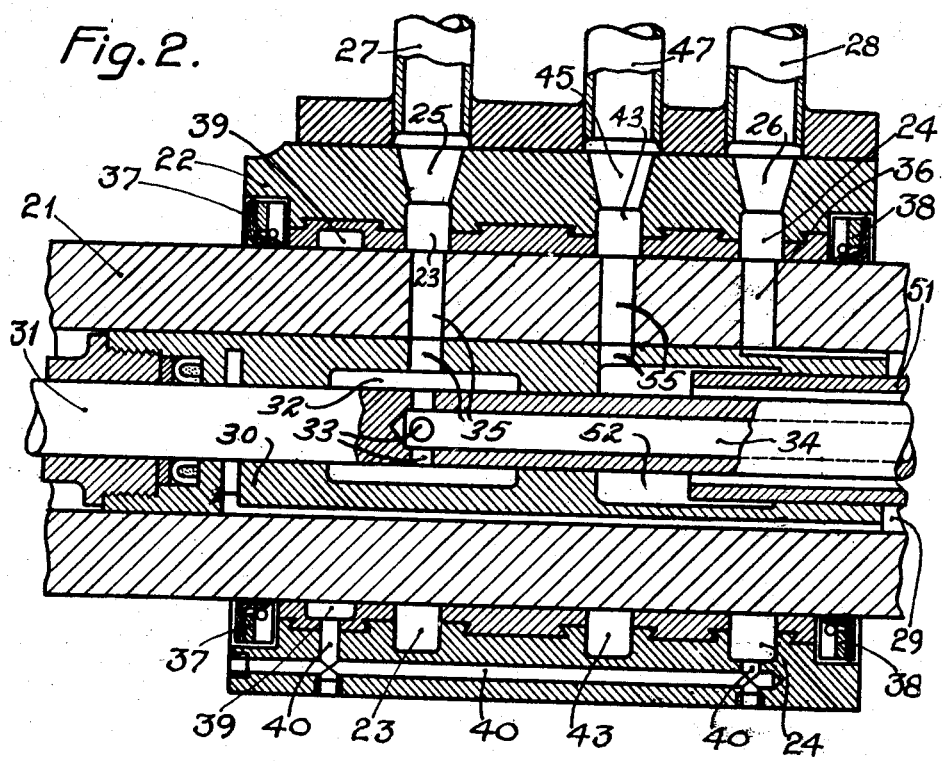
Inventor: John Elov Englesson
by George Bayard Jones,
Attorney Patented Jan. 16, 1940

2,187,147

UNITED STATES PATENT OFFICE 2,187,147

SWIVEL JOINT

John Elov Englesson, Kristinehamn, Sweden

Application April 5, 1939, Serial No. 266,144
In Sweden January 10, 1938

4 Claims. (Cl. 285—96.3)

For transferring a pressure fluid from a stationary conduit to a rotary conduit, or vice versa, for instance for conveying pressure fluid to a servo-motor built into a shaft or into a hub on a shaft, a device is used which consists of a stationary sleeve provided around the rotary conduit or shaft and having a packing box at least at one of its ends, usually at both ends, said sleeve having a passage for high pressure fluid connected to the stationary conduit and communicating through an aperture in the wall of the rotary shaft or conduit with the interior thereof. Difficulties are always met with, however, in transferring the pressure fluid in this manner to the rotary shaft or conduit, due to the fact that it is difficult to make packings which are proof against the high pressure required. If the shaft has a large diameter at the place where the transfer of the pressure fluid is to take place, the difficulties are further increased owing to the higher peripheral speed. In order to avoid this transfer of pressure fluid, therefore, resort has been taken, for instance in the case of turbine shafts, to making also the pressure pump for the pressure fluid rotating with the shaft.

According to the present invention the difficulty connected with the abovementioned transfer of pressure liquid is eliminated by there being provided intermediate the passage for high pressure fluid and the packing box, a space in the slide face between the rotary conduit or shaft and the sleeve, which space communicates with a passage for the discharge of fluid from said space to a low pressure conduit or the like. Thus, the packing box need only make a tight seal against the lower pressure prevailing in the last mentioned passage. Since the bearing pressure in the packing box stands in a direct relation to the pressure against which the packing box shall make a tight seal, it will easily be understood that the difficulty of providing a tight box that does not run hot, is considerably reduced by the arrangement according to the present invention.

In the accompanying drawing two constructional forms of devices according to the invention are illustrated by way of example. Fig. 1 shows an axial section through a pressure liquid inlet according to the invention for a ship's propeller having blades adjustable by hydraulic means, in which the regulating valve for the servomotor is placed in the shaft or in the hub body. Fig. 2 shows a section through a pressure liquid inlet for ship's propellers, in which the pressure oil regulating valve for the servomotor is located outside the shaft and hub.

In Fig. 1, 1 denotes the propeller shaft, and 2 denotes the stationary sleeve which is provided with a groove 3 extending around the shaft and communicating through a passage 5 with an oil supply conduit 7 from a pressure pump. A lining 10 is rigidly secured in the bore 9 of the propeller shaft, the valve rod 11 being slidable axially in said lining. The portion of the valve rod 11 located in the lining is provided with radial passages 13 which connect the chamber 12 in the lining 10 with the axial passage 14 in the valve rod, said passage 14 leading to a regulating valve slide, not shown, which is connected to the valve rod and is located in the propeller hub. The groove 3 communicates through a radial passage 15 in the shaft 1 and lining 10 with the chamber 12 in the lining. The sleeve 2 is packed against the propeller shaft 1 by means of two packing boxes 17 and 18 (collar packings). Pressure liquid under high pressure is supplied from the conduit 7 through the passage 5, groove 3, passage 15, chamber 12, passages 13, and passage 14 to the regulating slide for the servomotor, not shown.

According to the invention, there is provided intermediate the groove 3 which is under high pressure and each packing box 17 and 18, a space in the slide-face between the shaft 1 and the sleeve 2, which space communicates with a passage for the discharge of any fluid that may enter the said space, to a low pressure conduit or the like.

In the instance illustrated, the space between the groove 3 and the packing box 18 consists of a groove 4 in the sleeve that extends around the shaft, and which communicates through a passage 6 in said sleeve with an oil discharge conduit 8 to an oil tank. The groove 4 also communicates through a passage 16 in the propeller shaft 1 with the bore 9 in the latter, through which bore liquid under low pressure flows back from the regulating slide of the servomotor and then through the passage 16, groove 4, passage 6 and conduit 8 to the oil tank. Therefore, the packing box 18 need only provide a tight seal against the low pressure in the groove 4.

A groove in the sleeve 2 similar to the groove 4 provides a space 19 between the groove 3 and the packing box 17, which space communicates through a passage 20 with the low pressure space 4, so that the same low pressure will prevail also in the space 19, and consequently, also the packing box 17 need only provide a tight seal against the low pressure in the conduit 8 and in the oil tank.

The arrangement according to Fig. 2 is in the main similar to that illustrated in Fig. 1, and as in the latter the stationary sleeve 22 surrounding the propeller shaft 21 is provided at its ends with packing boxes 37 and 38.

In this constructional form the valve, not shown, which controls the supply and discharge of the pressure liquid to and from the servomotor located in the propeller hub, is not located in the propeller hub or in the shaft but outside the latter, and is interposed between two conduits 27 and 47 so that, by means of the valve, pressure liquid may be supplied to these two conduits in the manner required for operating the servomotor.

In the same manner as the conduit 7 in Fig. 1, the conduit 27 in Fig. 2 communicates through the passage 25 and the annular groove 23 in the sleeve 22 and through the passage 35 in the propeller shaft 21 and in the lining 30 rigidly secured in the latter, with the chamber 32 in said lining, and communicates through the radial passages 33 in the rod 31, which is slidable in said lining and which is rigidly secured to the piston of the servomotor, with the passage 34 in said rod 31, which passage leads to one side of the servomotor piston.

In a corresponding manner the conduit 47 communicates through a passage 45 and the annular groove 43 in the sleeve 22 and through the passage 55 in the shaft 21 and lining 30 with another chamber 52 in said lining, which chamber is in open communication through the hollow piston rod 51, which is connected to the servomotor piston and which is guided in said lining 30, with the other side of the servomotor piston.

Between the groove 43 and the packing box 38 there is provided an annular groove 24 in the sleeve 22, which groove communicates through the passage 30 in the shaft 21 with the bore 29 in said shaft, and which communicates through the passage 26 with a conduit 28. Through said conduit 28 oil under a comparatively low pressure is supplied to the crank pin chamber in the propeller hub in order to prevent water from penetrating into said chamber and reaching the crank pin mechanism of the propeller blades. The packing box 38 at this end of the sleeve 22 need thus only make a tight seal against this comparatively low pressure in the conduit 28 and in the groove 24 connected with the same, and consequently, the packing box 38 will not be subjected to high pressure from any of the high pressure conduits 27 and 47.

In the same manner as according to Fig. 1, there is provided between the high pressure conduit 27 and the packing box 37 at the other end of the sleeve an annular space 39 which communicates through a passage 40 in the sleeve with the space 24, and consequently, also the packing box 37 cannot be directly subjected to the high pressure in the high pressure conduits.

The invention is, of course, not restricted to the constructional forms above described and illustrated in the drawing by way of example. The spaces or grooves 4 and 19, or 24 and 39, may, for instance, be made in the form of grooves in the shaft extending around the same, instead of in the sleeve, and this also applies to the grooves 3, or 23 and 43. Also the discharge passage 20, or 40, may be located in the shaft.

I claim:

1. A means for transferring a pressure fluid from a stationary conduit to a rotary conduit, or vice versa, comprising in combination with said stationary conduit and said rotary conduit, a stationary sleeve around said rotary conduit, a passage for high pressure fluid in said sleeve connected to said stationary conduit, an aperture in the wall of said rotary conduit providing communication between said rotary conduit and said passage in said sleeve, a packing box at least at one end of said stationary sleeve, a space in the slide face between said rotary conduit and said sleeve intermediate said packing box and said passage in said sleeve, a passage for discharge of fluid communicating with said space, and a low pressure conduit communicating with said last-mentioned passage.

2. A device of the character described, comprising in combination a stationary conduit, a rotary conduit, a stationary sleeve around said rotary conduit, a passage for high pressure fluid in said sleeve connected to said stationary conduit, an aperture in the wall of said rotary conduit providing communication between said rotary conduit and said high pressure passage in said sleeve, a packing box at least at one end of said stationary sleeve, a space in the slide face between said rotary conduit and said sleeve intermediate said packing box and said high pressure passage in said sleeve, a second passage in said stationary sleeve communicating with said space, a second stationary conduit connected to said second passage in said sleeve, and a passage for low pressure fluid in said rotary conduit communicating with said space.

3. A device of the character described, comprising in combination a stationary conduit, a rotary conduit, a stationary sleeve around said rotary conduit, a passage for high pressure fluid in said sleeve connected to stationary conduit, an aperture in the wall of said rotary conduit providing communication between said rotary conduit and said high pressure passage in said sleeve, packing boxes at each end of said stationary sleeve, spaces in the slide face between said rotary conduit and said sleeve intermediate said packing boxes and said high pressure passage in said sleeve, said spaces consisting of annular grooves in said sleeve, a passage in said sleeve connecting said grooves with one another, and a low pressure discharge passage communicating with said spaces.

4. A device of the character described, comprising in combination a stationary conduit, a rotary conduit, a stationary sleeve around said rotary conduit, a passage for high pressure fluid in said sleeve connected to said stationary conduit, an aperture in the wall of said rotary conduit providing communication between said rotary conduit and said high pressure passage in said sleeve, packing boxes at each end of said stationary sleeve, spaces in the slide face between said rotary conduit and said sleeve intermediate said packing boxes and said high pressure passage in said sleeve, said spaces consisting of annular grooves in said sleeve, a passage in said sleeve connecting said grooves with one another, a low presure passage in said stationary sleeve communicating with said spaces, a second stationary conduit connected to said low pressure passage in said sleeve, and a passage for low pressure fluid in said rotary conduit communicating with said spaces.

JOHN ELOV ENGLESSON.